(12) United States Patent
Riedmann (10) Patent No.: US 6,802,065 B1
(45) Date of Patent: Oct. 5, 2004

(54) SYSTEM AND METHODS FOR PERMITTING ACCESS TO A SINGULAR NETWORK PROCESS BY MULTIPLE USER PROCESSES

(75) Inventor: John Riedmann, Phoenix, AZ (US)

(73) Assignee: Honeywell Inc., Morristown, NJ (US)

(*) Notice: Subject to any disclaimer, the term of this patent is extended or adjusted under 35 U.S.C. 154(b) by 0 days.

(21) Appl. No.: 09/223,084

(22) Filed: Dec. 29, 1998

(51) Int. Cl.$^7$ ................................................. G06F 9/46
(52) U.S. Cl. ...................................... 719/312; 718/100
(58) Field of Search ................................. 719/330, 315, 719/313, 312, 316; 718/100–102

(56) References Cited

U.S. PATENT DOCUMENTS

| | | | | |
|---|---|---|---|---|
| 6,182,108 | B1 * | 1/2001 | Williams et al. | 709/315 |
| 6,243,764 | B1 * | 6/2001 | Leach | 708/316 |
| 6,304,564 | B1 * | 10/2001 | Monin | 370/338 |
| 6,321,274 | B1 * | 11/2001 | Shakib | 709/330 |
| 6,345,296 | B1 * | 2/2002 | McCrory | 709/228 |
| 6,463,480 | B2 * | 10/2002 | Kikuchi et al. | 709/315 |
| 6,477,586 | B1 * | 11/2002 | Achenson et al. | 709/330 |
| 2001/0054055 | A1 * | 12/2001 | Bollella | 709/102 |
| 2001/0056457 | A1 * | 12/2001 | Kikuchi | 709/104 |

OTHER PUBLICATIONS

Alan Mainwaring and David Culler, "Active Message Applications Programming Interface and Communication Subsystem Organization," 1995, Computer Science Division University of California at Berkeley, Section 3.*

David Nicol and Philip Heidelberger, "Parallel Execution for Serial Simulators," 1996, ACM, p. 210–242.*

Martin Hall, Mark Towfiq, Geoff Arnold, David Treadwell, and Henery Sanders, "Windows Sockets: An Open Interface for Network Programming under Microsoft Windows," Jan. 1993, Version 1.1, p. 1–59.*

Alan Mainwaring and David Culler, "Active Message Applications Programming Interface and Communication Subsystem Organization," 1995, Computer Science Division University of California at Berkeley, Section 3.*

Yutaka Ishikawa, "The MPC++ Multi–Thread Template Library on MPI," Oct. 1997, Documentation Revision 0.1.*

* cited by examiner

*Primary Examiner*—Meng-Al T. An
*Assistant Examiner*—Li B. Zhen (57) ABSTRACT

An application provides access by multiple user processes to a single network process. The application includes a socket library and a network process which contains the device driver software for a plurality of network devices and components. The socket library provides the interface mechanism to the network process and can be created as a static or dynamically linked library. All user processes access a singular network process by calling a function in the socket library. The socket library communicates with the network process by formatting a message containing all the information necessary for the network process to fulfill the intent of the API call. The network process sends a message that is received by the socket library which, in turn, transmits to the user process the return value and any data received from the network process.

16 Claims, 6 Drawing Sheets

SYSTEM AND METHODS FOR PERMITTING ACCESS TO A SINGULAR NETWORK PROCESS BY MULTIPLE USER PROCESSES

FIELD OF THE INVENTION

The present invention relates generally to operating systems used in modern day computing environments and more specifically to a network architecture and related methods for permitting one or more user processes to access a single network process. The invention has practical application in operating environments wherein multiple user processes need access to device driver software through a single network process.

BACKGROUND OF THE INVENTION

Within networked environments, it is often desired and necessary to share access to the network interface among many user processes. Typically, the network topology incorporates a mechanism for allocating network resources amongst all processes while at the same time assuring that multiple user access to those resources is handled efficiently and in a structured manner. Operating systems offering robust time and space partitioning are one example of such a network topology.

In general terms, space partitioning means that the software executing on one process cannot affect the operation of another process. Thus, space partitioning can be defined at the process level. A process, in turn, is comprised of multiple threads each of which has its own context.

For example, the context for a particular thread may contain the instruction pointer to a software instruction currently in execution. The operating system can then switch to a second thread in the process without losing its point of execution in the first thread. Although, the contents of the CPU registers changes from the context of the executing thread to the context of the second thread, the overall integrity of the process is maintained.

In contrast, within a single process one thread can affect the operation of another thread. Thus, if two threads are within the same process they can affect each other since they are within the space partitioning boundary of the process. Likewise, any thread running in first process cannot be affected by a thread in a second process.

The problem inherent to operating systems employing space and time partitioning is that access to the network processes is oftentimes very rigidly defined. A uniform method of communicating with external devices on the network within the context of multiple users processes attempting to access a single network process has not, has not until the present invention, been achieved. Preferably, all threads in the user process would have access to the network interface employed by the operating system.

SUMMARY OF THE INVENTION

According to one aspect of the invention, disclosed are a set of functions and operations which may be employed in an application to provide access by multiple user processes to a single network process. The invention has practical application within the context of an operating system that provides for multiple processes and multiple threads within a process such as a space and time partitioning operating system. An example application would be in the aviation industry where certification is expensive due to the increasing complexity of modern avionics control systems.

Also disclosed is a software means for allowing any user process to access a single network process. The network process contains the device driver software for a plurality of network devices and components which a user may wish to access. The socket library provides the interface mechanism to the network process and can be created as a static or dynamically linked library.

In operation, all user processes access a singular network process by calling a function in the socket library.

The user process can be based on an Application Programmer Interface (API) socket model as implemented by the Berkeley software distribution or the Windows Socket Implementation model.

The socket library communicates with the network process. The socket library formats a message containing all the information necessary for the network process to fulfill the intent of the API call. The message may also include any required data. The socket library then sends the message to the network process.

Once the network process receives the message, it performs whatever activity is necessary to fulfill the intent of the API call.

The network process sends a message to the user process that placed the call containing a return value and any related data. The socket library receives the message on behalf of the user process and, in turn, transmits to the user process the return value and any data received from the network process.

In one embodiment, the socket library and network process communicate using a mailbox. A mailbox is a method of communicating between processes. Mailboxes are aperiodic so that information can be transmitted at any time. Thus, the invention utilizes point to point communications so that a message is sent to a specific mailbox which is owned by a specific process and the sending process must have been granted access by the receiving process to send that message. Otherwise the send will fail.

A technical advantage of the present invention is that access to the network interface is established and relinquished dynamically.

Another technical advantage of the present invention is that balance between performance and resource utilization is easily adjusted.

Still another advantage of the present invention is that the number of threads that can access the network interface is easily adjusted.

BRIEF DESCRIPTION OF THE DRAWINGS

Other aspects of the invention including specific implementations are understood by reference to the following detailed description taken in conjunction with the appended drawings in which.

References in the figures correspond to like numerals in the detailed description unless otherwise indicated.

DETAILED DESCRIPTION OF THE PREFERRED EMBODIMENTS

While the invention is described in connection with user processes employing an Application Programmer Interface (API) based on the socket model as implemented by the Berkeley Software Distribution and/or Windows Socket Implementation, it should be understood that the principles disclosed and employed by the invention have practical application in any network environment where multiple user processes need access to device driver software through a single network process.

Wherever appropriate, the following definitions are applied to the following terms:

Dynamic—The term used to convey the idea that an event occurs during run-time, i.e. after system startup, and prior to shutdown. For example, a dynamic thread may be created any time after system startup, and prior to shutdown.

Handle—An identifier that is created by the Operating System ("OS") for each system object, such as a process or thread. Each handle is unique within the scope of all handles for all objects.

Mailbox—An inter-process communication device that supports many senders and one receiver.

Period—A length of time within which a thread is guaranteed to have the opportunity to run for the amount of time specified within the thread template on which the thread is based. For example, a thread may have the opportunity to run for 1 millisecond every 25 milliseconds. In this case, the thread's period is 25 milliseconds.

Platform Registry—Data available to the OS that describes attributes of processes and threads, among other things. For example, the registry contains the number of mailboxes that can be created by each process, and the amount of CPU time allocated to each thread.

Process—The term used to collectively refer to a specific process template, a file containing executable instructions, and a space partition.

Process Template—Data within the platform registry that describes a process. For example, the number of dynamic threads that can be created is defined in the process template. Zero or more processes can be instantiated from a process template.

Space Partition—A set of addresses assigned to a process that may be accessed without causing an access violation.

Stack—A data structure that is created by the OS for each thread based on the appropriate thread template. The stack is used for accessing function parameters, and for local data storage and retrieval.

Thread—The term used to collectively refer to a specific thread template, a programmatic function that is executed when the thread is made to run, and a stack.

Thread Template—Data within the platform registry that describes a thread. For example, the amount of CPU time available to the thread within each period is defined in the thread template. Zero or more threads can be instantiated from a thread template.

Mailboxes

Mailboxes allow processes to communicate with each other in an aperiodic manner. When a mailbox is created, any thread in the creating process can retrieve messages from it, and any thread in a process which has been explicitly granted access to the mailbox can send a message to it. An Operating System (OS) Integration Tool can be used to permit implementation of both dynamic and static mailboxes. When a mailbox is created, whether it is static or dynamic, no other process will have access to that mailbox until access rights are granted.

The enumerated functions and services herein are described in sufficient detail and specificity to permit one skilled in the art to implement the invention according to specific embodiments. Such functions and services can be utilized in a software application that permits access to a single network process by one or more user processes.

Figure 1:
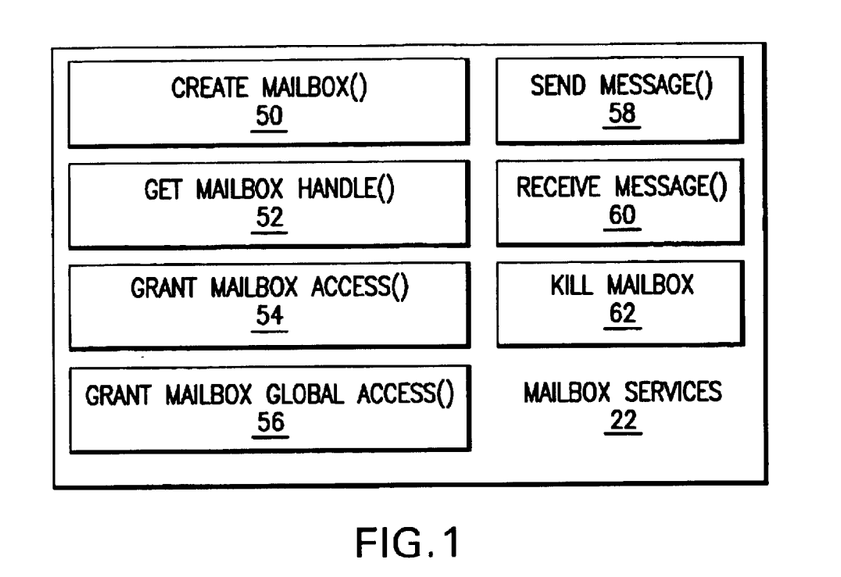
FIG. 1 illustrates the mailbox services used by the invention.

Mailbox Services 22 FIG. 1 shows the mailbox services 22 according to one embodiment. Each service is described below as follows.

Function: createMailbox( ) 50—This function creates a dynamic mailbox that is accessible by all threads in the calling process. Static mailboxes are created automatically by the OS, and are named, and cannot be deleted. Dynamic mailboxes are created via this service, have no names, and they can be deleted. CreateMailbox( ) 50 returns a mailbox handle which is used by other mailbox related services. Since dynamic mailboxes have no names, the handle must somehow be communicated to other processes in order for those other processes to access the mailbox. One way this might be done is to send the handle of a dynamically created mailbox to another process' static mailbox, where that other process expects to get a mailbox handle.

When a mailbox is first created, no other process in the system has the access rights needed to send a message to it. Before any message can show up in the mailbox from another process, the grantMailboxAccess( ) or grantMailboxGlobalAccess( ) service must be used.

The following routine illustrates the interface with the createMailbox( ) 50 function:

```
ipcStatus createMailbox(
        DWORD           /* messageSizeInBytes */, /*
unused for now */
        DWORD           queueSizeInMessages,
        ipcMailboxHandle    *handle);
```

| Parameter | Description |
|---|---|
| MessageSizeInBytes | In one embodiment, only page sized messages can be used with mailboxes. |
| QueueSizeInMessages | The total number of pages/messages that can be queued in the mailbox at any particular time. This space comes out of the callers RAM budget, which is defined in the OS Integration Tool. |
| Handle | Returned as a handle to the new mailbox |
| Returned Status: | |
| Status | Description |
| IpcValid | The new mailbox was created successfully. |

-continued

| | |
|---|---|
| IpcQuotaExceeded | The maximum number of Mailboxes for the process have already been created OR The maximum number of Envelopes for the process have already been created OR The RAM needed to create the queueSizeInMessages number of envelopes was not available. |

Warnings/Restrictions: When a mailbox is initially created, it contains no messages. When a mailbox is initially created, no other process in the system has the access rights necessary to send a message to it, including the creating process itself.

Function: getMailboxHandle( ) 52—This function is used to obtain a handle to a "static" mailbox in a specified process. All static mailboxes for a process are automatically created by the OS when the process is started. This service provides the ability to get a mailbox handle from an integration time assigned mailbox name ID.

The following routine illustrates the interface to the getMailboxHandle( ) 52 function:

```
ipcStatus getMailboxHandle(
    DWORD              mailboxName,
    process_handle_t   processHandle,
    ipcMailboxHandle*  handle );
```

| Parameter | Description |
|---|---|
| MailboxName | The name of the mailbox assigned at integration time via the OS Integration Tool. |
| ProcessHandle | Handle to the process which created the mailbox. |
| Handle | Returned is a handle to the mailbox. |

Returned Status:

| Status | Description |
|---|---|
| IpcValid | The mailbox was found in the specified process, and a handle to it was returned. |
| IpcInvalid | The static mailbox named mailboxName does not exist in the specified process. |
| IpcInvalidProcess-Handle | The specified process handle is invalid. |

Warnings/Restrictions: There are no access rights checks when obtaining a mailbox handle. Access rights are only checked when sending or receiving messages via the returned handle.

Function: grantMailboxAccess( ) 54—When a mailbox is initially created, the creating process is automatically granted read access to it. No process has write or send access to it. For a mailbox to be useful for interprocess communication, other processes must be allowed to send messages. This function is used to grant a specific process the ability to send messages to a mailbox created by the calling process.

The following routine illustrates the interface with the grantMailboxAccess( ) 54 function:

```
ipcStatus grantMailboxAccess(
    ipcMailboxHandle   handle,
    process_handle_t   processHandle);
```

| Parameter | Description |
|---|---|
| Handle | Handle to the mailbox for which access is being granted. |
| ProcessHandle | Handle to the process which will be granted access to the mailbox. |

Returned Status:

| Status | Description |
|---|---|
| ipcValid | The specified access was granted to the specified process. |
| IpcInvalidMailbox-Handle | The specified mailbox handle is not valid. It could have been modified by the user inadvertently, or another thread in the callers process could have deleted the mailbox. |
| IpcInvalidProcess-Handle | The specified process handle is not valid. It could have been modified by the user inadvertently, or the process could have been deleted. |
| IpcInsufficient-Privilege | The calling process is not the process which created the mailbox. Only the owner of a mailbox can change the access rights. |

Warnings/Restrictions: Only the process which owns a mailbox can change its access rights.

Function: grantMailboxGlobalAccess( ) 56—When a mailbox is initially created, the creating process is automatically granted read access to it. No process has write or send access to it. For a mailbox to be useful for interprocess communication, other processes must be allowed to send messages. This function is used to grant all processes the ability to send messages to a mailbox created by the calling process. Note that all processes includes not only all currently created processes, but also any dynamic process which may be created in the future.

The following routine illustrates the interface with the grantMailboxGlobalAccess( ) 56 function:

```
ipcStatus grantMailboxGlobalAccess (ipcMailboxHandle handle);
```

| Parameter | Description |
|---|---|
| Handle | Handle to the mailbox who access list is to be changed. |

Returned Status:

| Status | Description |
|---|---|
| IpcValid | The specified access was granted to the specified process. |
| IpcInvalidMailbox-Handle | The specified mailbox handle is not valid. It could have been modified by the user inadvertently, or another thread in the callers process could have deleted the mailbox. |
| IpcInsufficient-Privilege | The calling process is not the process which created the mailbox. Only the owner of a mailbox can change the access rights. |

Warnings/Restrictions: Only the process which owns a mailbox can change its access rights.

Function: sendMessage( ) 58—This service is used to send a message to a specified mailbox.

The following routine illustrates the interface to the sendmessage( ) 58 function:

| | |
|---|---|
| ipcStatus sendMessage( | |
| ipcMailboxHandle | handle, |
| void | *messageBuffer, |
| unsigned | messageLengthInDwords, |
| bool | blockIfMailboxFull); |

| Parameter | Description |
|---|---|
| Handle | Handle to the mailbox to send the message to. |
| MessageBuffer | Pointer to structure in caller space containing the message to send |
| MessageLengthInDwords | Number of DWORDS to copy from messageBuffer onto the envelope (page needed to queue the message in the mailbox) |
| BlockIfMailboxFull | When false, and the destination mailbox is full, the message will not be sent and the ipcQuotaExceeded will be immediately returned. When true, and the destination mailbox is full, the calling thread will be blocked until the message can be queued. When a message is received from a mailbox, a OS event is pulsed which readies all the blocked senders to the mailbox. Exactly which blocked sender gets to send its message is based on priority. If multiple blocked senders have the same priority, the one which gets to send its message is selected arbitrarily. Note that multiple senders can be located in multiple processes, depending on how the mailbox owner has granted access to it. |

Returned Status:

| Status | Description |
|---|---|
| IpcValid | The message was send and queued in the specified mailbox. |
| IpcInvalidMessage-Length | When sending a message, an envelope is created and the message is copied onto the envelope. An envelope is 4K, but sendMessage uses the first 4 bytes as a message length. MessageLengthInDwords cannot exceed 4092 bytes. |
| ipcInvalid | In order to send a message, an envelope has to be created. In this case, the envelope could not be created. For more details on why this could fail, refer to the createEnvelope( ) primitive below. |
| IpcNoMessage | The primitive sendEnvelope( ) failed for some reason. Refer to it in the primitives section below for additional information. |
| IpcInsufficient-Privilege | The calling process does has not been granted access to the specified mailbox. |

Warnings/Restrictions: In order to send a message, the calling process must have a free envelope to send. When the sendmessage service complete, the envelope will be returned to the caller. When passing blockIfMailboxFull=true, be aware that the calling thread could be blocked for multiple periods and possibly forever. It will only resume when a message is received from the mailbox, and the mailbox owner could be another process. Note also that a higher priority sending process could re-fill the mailbox after a message has been received before the blocked sender gets to run, causing the blocked sender to remain blocked.

Function: receiveMessage( ) 60—This service is used to receive a message from a mailbox. If there are multiple messages in the mailbox, the message that has been in the queue the longest is returned (i.e., its a FIFO queue).

The following routine illustrates the interface to the receiveMessage( ) 60 function:

| | |
|---|---|
| ipcStatus receiveMessage( | |
| ipcMailboxHandle | handle, |
| void | *messageBuffer, |
| unsigned | maxMessageSizeInDwords, |
| bool | waitForMessage); |

| Parameter | Description |
|---|---|
| Handle | Handle to the mailbox to receive a message from. |
| MessageBuffer | Pointer to structure to store the message in. |
| MaxMessageSize-InDWords | When the message was sent, its length was identified. By default, that many unsigned words (4 bytes) will be copied into messageBuffer. The service will copy the proper number of unsigned words (the number of bytes sent), but will stop copying when maxMessageSize words have been copied. |
| WaitForMessage | When false, and the mailbox is empty no message will be received and the call will immediately return with the ipcNoMessage status code. When true, and the mailbox is empty, the calling thread will be blocked until a message is sent to the mailbox and received by the thread. Note that if there are multiple receiving threads blocked on the mailbox, the message will be given to the highest priority thread. If there are multiple threads of the same highest priority blocked on the mailbox, the thread selection is arbitrary. |

Returned Status:

| Status | Description |
|---|---|
| IpcValid | A message was obtained from the mailbox and stored in messageBuffer. |
| IpcInvalidMail-boxHandle | The specified mailbox handle is invalid. |
| IpcInsufficient-Privilege | The calling process is not the owner of the mailbox. |
| IpcNoMessage | There are no messages in the mailbox. |

Warnings/Restrictions—The caller has no method of determining if the message was truncated when the message size exceeds maxMessageSize. The received message is simply truncated to maxMessageSize DWORDs. When passing waitForMessage=true, be aware that the calling thread could be blocked for multiple periods and possibly forever. It will only resume when a message is sent to the mailbox. Note also that a higher priority receiving process could receive the sent message before the blocked thread gets to run, causing the blocked receiver to remain blocked.

Function: killMailbox( ) 62—This service is used to destroy a dynamic mailbox. Static mailboxes cannot be killed. When a mailbox is killed, the envelopes allocated to the mailbox are returned to the process' quota of envelopes. The time required to perform this service may vary, and is dependent on the number of sendMessage( ) 58 requests in progress, receiveMessage( ) 60 requests in process, getMailboxHandle( ) 52 requests in progress, etc. The killMailbox( ) 62 service will first mark the mailbox as invalid, preventing any new requests of it, but it allows any in progress services to complete before freeing up the resources.

The following routine illustrates the interface to the killMailbox( ) 62 function:

| ipcStatus killMailbox (ipcMailboxHandle handle); | |
|---|---|
| Parameter | Description |
| Handle | Handle to the mailbox to delete. |
| Returned Status: | |
| Status | Description |
| IpcValid | The mailbox has been destroyed. |
| IpcInvalidMailbox-Handle | The specified mailbox handle is invalid. |
| IpcInsufficient-Privilege | The calling process is not the process which created the mailbox |
| IpcCantDeleteStatic | The specified mailbox is a static mailbox and cannot be deleted. |

Warnings/Restrictions: none

The aspects of the invention detailed below will allow those skilled in the art to implement any application through the operating system using an Ethernet interface. Specifically, the OS-specific characteristics of the socket interface are described.

| Acronyms and Abbreviations | |
|---|---|
| API | Application Programmer Interface |
| CPU | Central Processing Unit |
| OS | Operating System |
| IPC | Inter-process Communication |
| NAP | Network Application Process |

Figure 2:
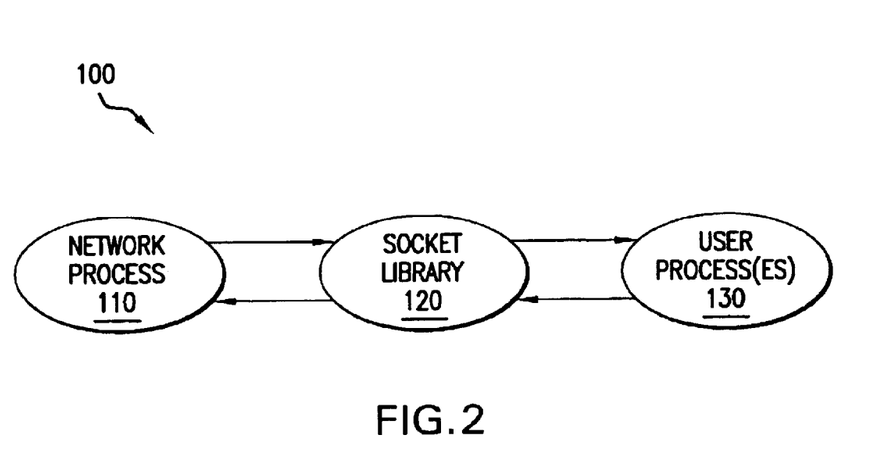
FIG. 2 illustrates the elements of implementing a network application process including the network process 110, the socket library 120 and the user process 130.

FIG. 2 illustrates the elements of a network application 100 according to one embodiment of the invention. Typically, any process can be a Network Application Process (NAP). A NAP can communicate with external devices over an Ethernet interface. The NAP makes calls to functions in a socket library to communicate with one or more devices.

As illustrated in FIG. 2, the elements of implementing a NAP include the network process 110, the socket library 120 and the user process 130. The network process 110 contains the device driver for the network hardware. The network process 110 is loaded onto the OS platform and included as a static process in the platform registry if network applications are to be used. The user is responsible for adding a static process based on the network process 110 template to the appropriate platform configuration using the OS Integration Tool.

The socket library 120 is linked to the user process 130 and provides the interface to the network process 110.

Figure 3:
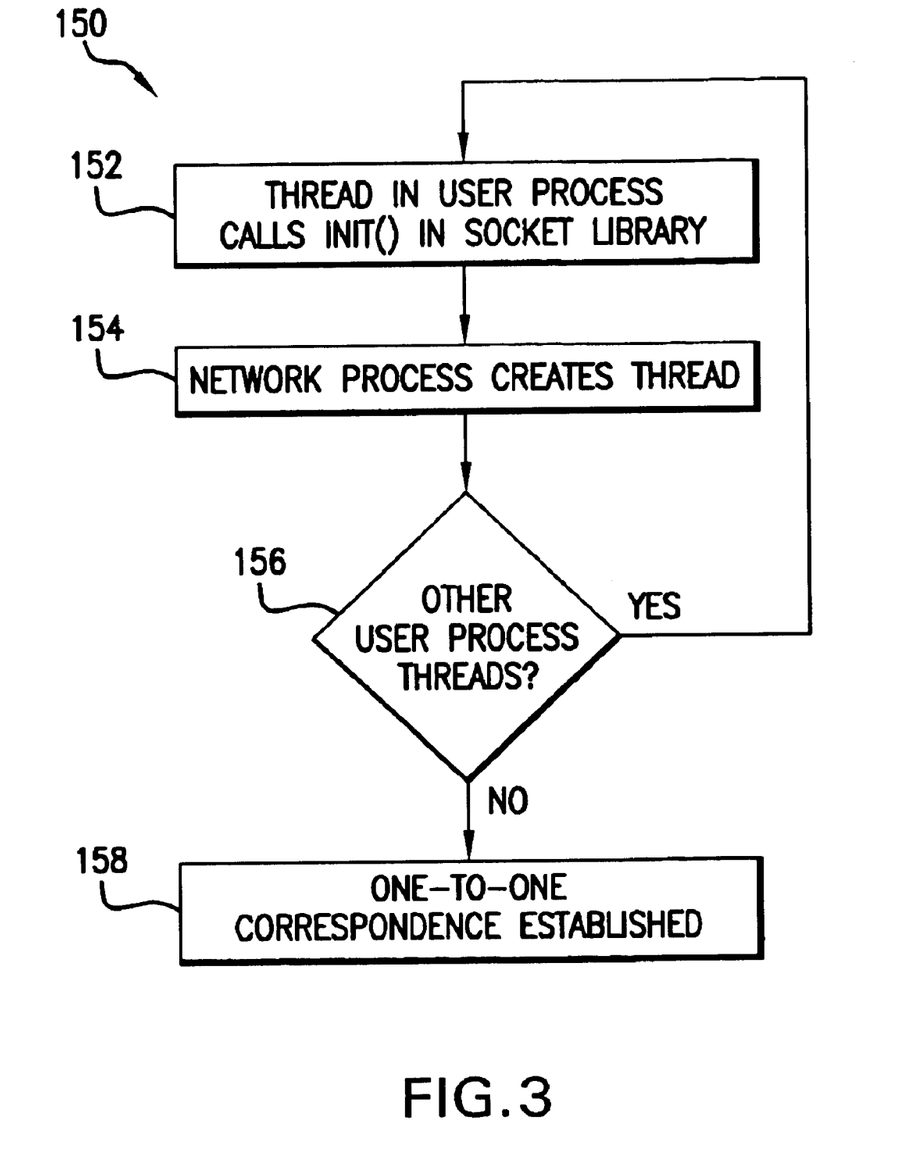
FIG. 3 is a process flow diagram for a method of accessing the network process according to one embodiment.

The process of accessing the network process 110 is illustrated in FIG. 3 and denoted generally as 150. Process 150 begins at step 152 when a thread in a user process 130 establishes a connection to the network process 100 by calling the init( ) function within the socket library 120. In response, at step 154 the network process 110 creates a thread to service the requesting thread in the user process. 130. As shown in steps 156 and 158, each thread in the user process 130 that calls init( ) causes another thread in the network process 110 to be created. This scheme provides an independent thread, step 158, in the network process 110 for each thread in the user process 130 that calls init( ). As a result, threads in the user process 130 can independently communicate with their corresponding external devices. A problem in accessing one device will not prevent other threads from accessing their devices.

Preferably, the number of threads that can call init( ) may be changed by the user via the platform registry.

Figure 4:
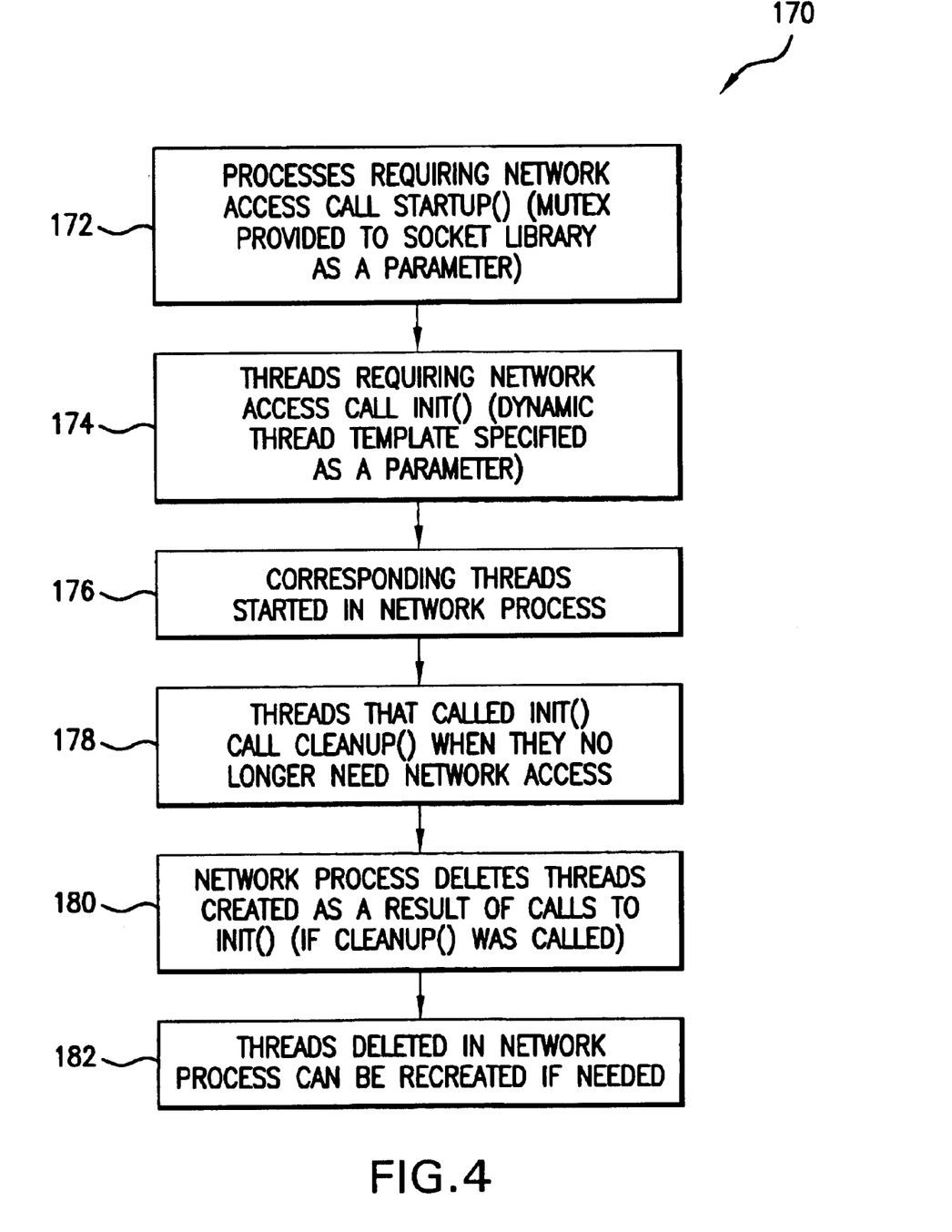
FIG. 4 is a process flow diagram for a method of writing a network application according to one embodiment.

FIG. 4 illustrates the process, denoted generally as 170, for writing a network application. Process 170 starts at step 172 wherein a process requiring network access calls the function startup( ) in the socket library 120. The socket library 120 can be provided with a mutex to support multi-threaded applications. Next, at step 174 threads requiring network access call the function init( ) in the socket library 120. The threads in the NAP should not use this mutex.

A single call to init( ) is required by each thread that makes socket calls. The parameter specifies a dynamic thread template. The thread template refers to one of the dynamic threads that is defined for the network process 110. Their rates and budgets can be set according to the needs of the application.

Next, at step 176, the corresponding threads in the network process 110 are started. Threads that called init( ) can call the function cleanup( ) when they no longer network access, step 178. If a dynamic process or thread is going to be deleted, cleanup( ) should be called prior to deletion. Each thread that calls init( ) should call cleanup( ). On the other hand, a thread that always makes socket calls does not have to call cleanup( ). The cleanup( ) function frees up resources in the network process 110.

When init( ) is called, a thread is started in the network process 110 to service the thread that called the init( ) function. When the cleanup( function is called at step 178, the network process 110 deletes the thread that was created as a result of the call to init( ) at step 180, and makes the thread available for recreation if needed, step 182. A user process 130 that fails to call the cleanup( ) function could needlessly exhaust all resources of the network process 110 if that process is repeatedly created and deleted. In this case, all subsequent calls to init( ) by any user process 130 would fail, resulting in the network application being unable to perform network communications.

In one embodiment, the socket library 120 communicates with the network process 110 using mailboxes. Whenever a socket call is made, a message is sent to the network process 110, which handles the request and sends back a response. Blocking mailboxes may be used for this purpose.

Blocking mailboxes allow for control to be transferred between the user process 130 and the network process 110 more than once in a period. Therefore, more than one socket call can be completed in a period. Note that a thread that makes a socket call is "blocked" during the time that it waits for a response from the network process 110. This means it is not executing and is not using its budget of CPU time. When the response from the network process 130 is available, the thread is made running.

Figure 5:
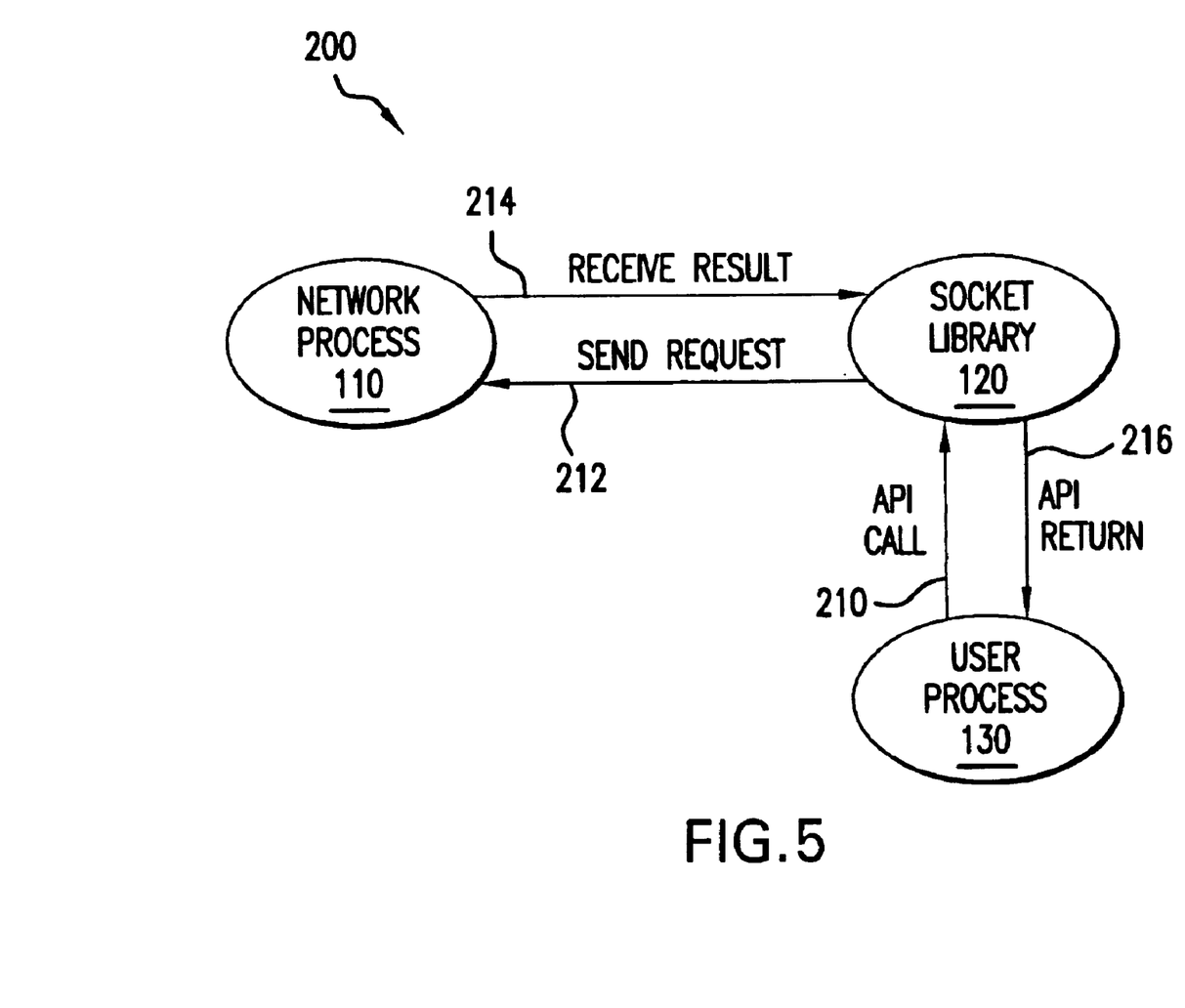
FIG. 5 is a process flow diagram for a method of basic sequence used to make an API call according to one embodiment.

Turning now to FIG. 5, the basic sequence used to make an API call is shown and denoted generally as 200. The sequence 200 begins when a user process 130 calls a function in the socket library 120. The call is indicated by the arrow 210. Next, the socket library 120 sends a message 212 to the network process 110 containing the information necessary for the network process 110 to fulfill the intent of the call 210. The network process 110 receives the message and performs whatever activity is necessary to fulfill the intent of the call 210.

The network process 110 sends a message 214 to the user process 130 containing the return value to the call 210 and any related data. The socket library 120 receives the message on behalf of the user process 130. The socket library 120 returns 216 to the user process 130, providing the return value and data received from the network process 214.

In one embodiment, before call 210 can be made, a function in the socket library 120 is called to establish access to the device driver software in the network process 110. This init( ) function may be called by each thread that requires access tp the network process 110. Access to the network interface uses resources in the network process 110 and thus it is desirable that a thread be able to free them up when they are no longer needed. This can be accomplished by a call to another function which is referred to as cleanup( ). By dynamically establishing and relinquishing access to the network interface, the use of dynamic threads and processes is supported by the present invention.

Figure 6:
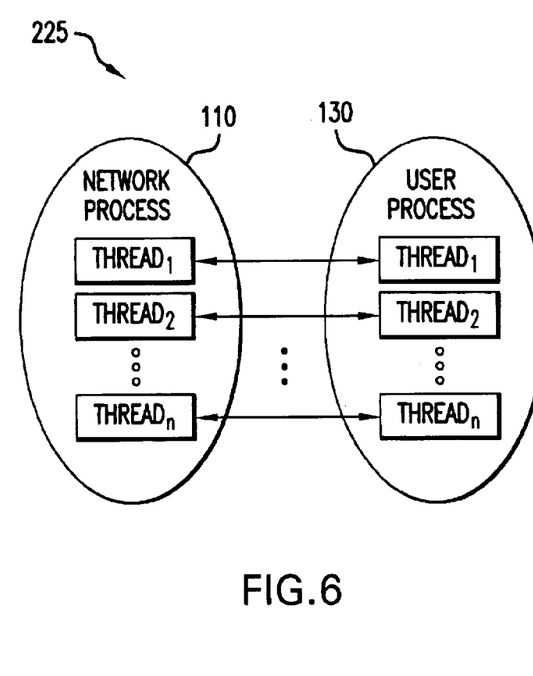
FIG. 6 illustrates the one-to-one relationship between threads created by the user process 130 and those created in the network process 110.

A feature of the present invention is the one-to-one relationship between threads created by the user process 130 and those created in the network process 110. This relationship is illustrated in FIG. 6 and denoted generally as.225. By associating thread handles with mailbox handles, the user process 130 and the network process 110 create a communications link between a pair of threads. Thus, whenever Thread1 in the user process 130 makes a call 210, it will be handles by a corresponding Thread1 in the network process 110.

This configuration does not limit the number of thread pairs that can be created. In addition, the number of processes that can establish a connection with the network process 110 is not limited since threads have independent access to the device driver software in the network process 110. In addition, Thread1 and Thread2 are able to communicate with different external devices independently. For example, if Thread1 attempts to receive data from its external device and the call 210 blocks, communications between Thread2 and its external devices are unaffected. In the prior art, this would not be the case since all threads are handled by a single thread in the network process.

Figure 7:
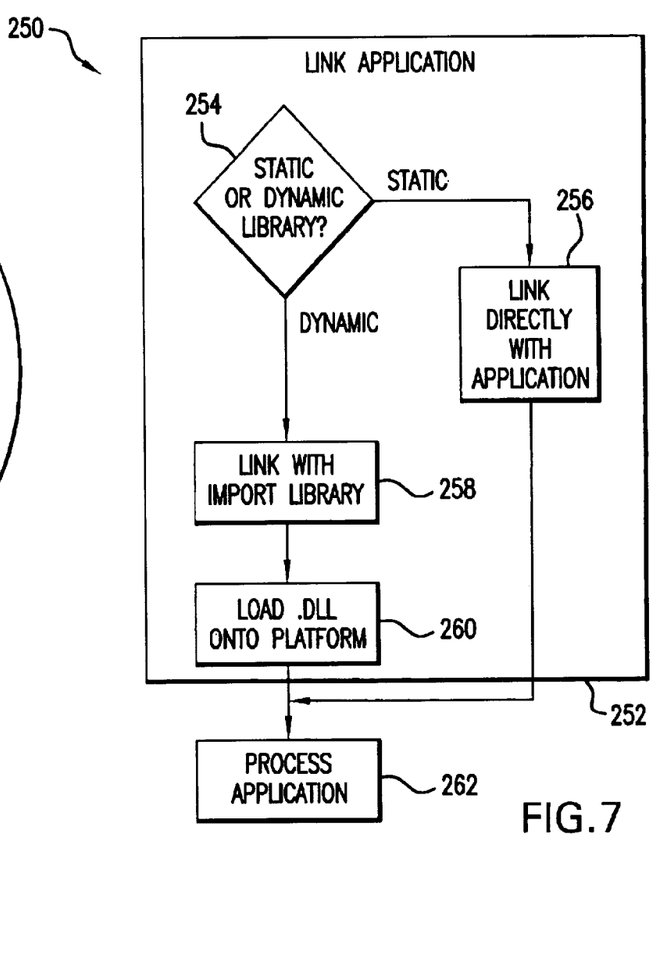
FIG. 7 is a process flow diagram for a method of building a network application according to one embodiment.

The process 250 for building a network application is illustrated in FIG. 7. Process 250 begins at step 252 when an application is linked with the socket library 120. The socket library 120 may be static (socket.lib) or dynamic (socket.dll), step 254. In the case of a static library, it is directly linked with the application, step 256. In the case of a dynamic library, the application is linked with an import library (socket.imp), step 258, and the DLL is loaded onto the platform, step 260. When the application is loaded onto the platform, it is linked with the DLL, step 262.

Figure 8:
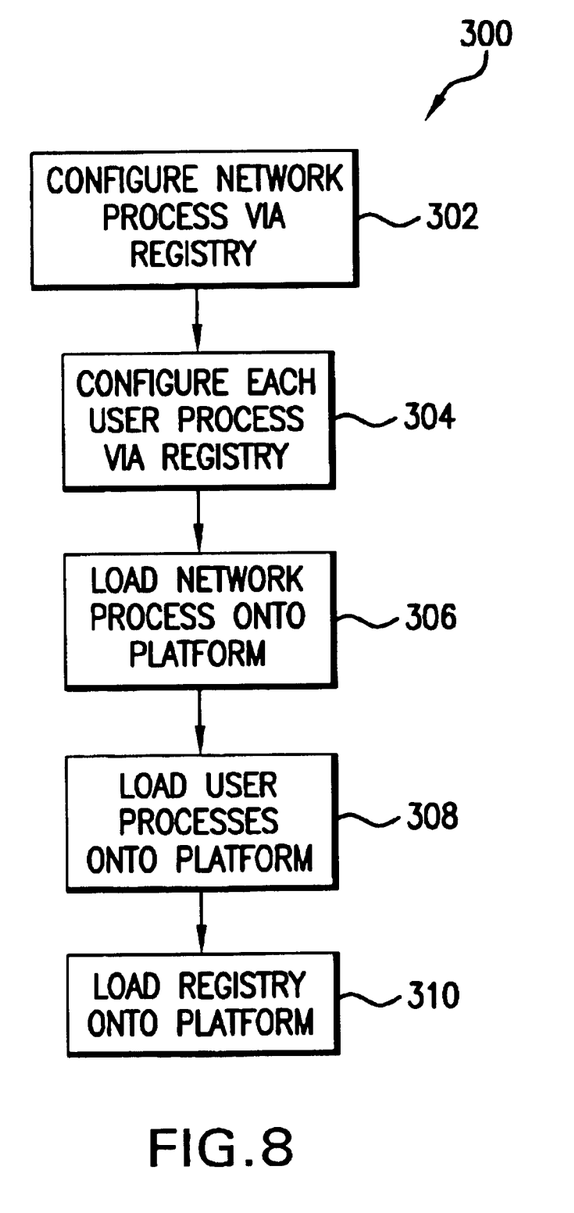
FIG. 8 is a process flow diagram for a method of configuring an OS platform according to one embodiment.

Turning to FIG. 8, the process for configuring the OS platform is shown and denoted generally as 300. Process 300 starts at step 302 wherein the network process 110 is properly configured for successful network communications via registry. Configuring the network process 110 involves configuring each user process via the platform registry, step 304, for the network process 110 and all user processes 130. Next, the network process 110 is loaded onto the platform at step 306.

In one embodiment, the platform registry entries provided below are the minimum required to support a user process 130. A particular user process 130 may need different entries depending on the resources it uses. Whatever the case, the user processes are loaded onto the platform, step 308, as well as the platform registry, step 310.

Listed below are the registry entries for the user process 130 and the network process 110 along with the corresponding socket library references for the process 300 of configuring the OS platform according to one embodiment:

Registry Entries for a User Process 130
Process template entries:

| Mutexes | 1 |
| Dynamic Mailboxes | One for each thread that calls init( ). |

Registry Entries for the Network Process 110

The network process 110 can be configured for the needs of the platform. Dynamic thread templates can be added, deleted or modified as needed.
Process template entries:

| Max Dynamic Threads | The number of threads on the platform that call init( ), and can be expected to be active simultaneously. |
| Max Dynamic Mailboxes | One for each possible dynamic thread. |

The following entries may be applied to the threads that are created as a result of calling the function init( ).
Socket Library Reference The socket library is based on an industry standard well known to those skilled in the art.

int accept(int s, sockaddr *name, int *namelen)
Return value:

| Socket descriptor | A value specifying a valid socket. |
| SOCKET_ERROR | The call to the Ethernet device driver software (in the Network process) encountered an error, or no connection requests were pending on socket s. |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | int bind(int s, const sockaddr *name, int namelen)
Return value:

| 0 | Success |
| SOCKET_ERROR | The call to the Ethernet device driver software (in the Network process) encountered an error. |
| SOCKET_ERROR_INIT_NOT_CALLED | The calling thread has not called init( ). It must be called before calls to other socket functions (except |

| | |
|---|---|
| | startup( )). |
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | int cleanup( )

Threads that call init( ) should call cleanup( ) when they no longer will be making socket calls. If a dynamic process or thread is going to be deleted, cleanup( ) should be called prior to deletion. Note that each thread that calls init( ) should call cleanup( ). If a thread is always going to make socket calls because it has no other purpose in life, cleanup( ) does not have to be called. This is a OS-specific function.

Return value:

| | |
|---|---|
| CLEANUP_STATUS_<br>SUCCESS | The Network process was notified that this thread will no longer be making socket calls. |
| SOCKET_ERROR_INIT_<br>NOT_CALLED | The calling thread has not called init( ). It must be called before calls to other socket functions (except startup( )). | int closesocket(int s)

Return value:

| | |
|---|---|
| 0 | Success |
| SOCKET_ERROR | The call to the Ethernet device driver software (in the Network process) encountered an error. |
| SOCKET_ERROR_INIT_<br>NOT_CALLED | The calling thread has not called init( ). It must be called before calls to other socket functions (except startup( )). |
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | int connect(int s, const sockaddr *name, int namelen)

Return value:

| | |
|---|---|
| 0 | Success |
| SOCKET_ERROR | The call to the Ethernet device driver software (in the Network process) encountered an error. |
| SOCKET_ERROR_INIT_<br>NOT_CALLED | The calling thread has not called init( ). It must be called before calls to other socket functions (except startup( )). |
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | hostentext *gethostbyname(char *name)

Return value:

| | |
|---|---|
| 0 | A null pointer is returned for several error conditions: init( ) has not been called for this thread; an error occurred in attempting to send a message to the Network process; an error occurred in attempting to receive a message from the Network process; the call to the Ethernet device driver software (in the Network process) encountered an error. |
| Valid pointer | Success | int getlasterror( )

If one of the other functions returns SOCKET_ERROR, getlasterror( ) can be called to retrieve additional information about the error. This function returns the most recent error caused by the calling thread.

Return value:

| | |
|---|---|
| 0 | The calling thread has not caused an error. |
| Non-zero value | The error value associated with the most recent error caused by the calling thread. | int getpeername(int s, sockaddr *peer, int *addrlen)

Return value:

| | |
|---|---|
| 0 | Success |
| SOCKET_ERROR | The call to the Ethernet device driver software (in the Network process) encountered an error. |
| SOCKET_ERROR_INIT_<br>NOT_CALLED | The calling thread has not called init( ). It must be called before calls to other socket functions (except startup( )). |
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | int getsockname(int s, sockaddr *name, int *namelen)

Return value:

| | |
|---|---|
| 0 | Success |
| SOCKET_ERROR | The call to the Ethernet device driver software (in the Network process) encountered an error. |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | int getsockopt(int s, int level, int optname, char *optval, int *optlen)

Return value:

| | |
|---|---|
| SO_MAX_UDP_QUE | Maximum number of input UDP packets which will be queued on the socket at one time. Any additional input packets will be dropped. The default is no limit. |
| SO_NAGLE | The Nagle Algorithm prohibits sending of small TCP packets while there is an any outstanding output data which has not been acknowledged. The default is the Nagle algorithm enabled. |
| SO_DELAY_ACK | Delay sending TCP acknowledgment for up to 200 milliseconds. In a stream of full-size packets, every other packet will be acknowledged. The default is to delay the acknowledgments. |
| SO_REUSESOCK | Enable/disables ability to reuse a socket in the timed-wait state if no other sockets are available. The default is not to reuse the socket. |
| SO_TCP_NO_COPY | Enables/disables copying of TCP input/output data directly to input/output packets. The default is no copy mode disabled. |
| SO_UDPCKSUN_IN | Enables/disables checking input packet checksums. The default is to check the checksums. |
| SO_UDPCKSUM_OUT | Enable/disables generating checksums for output packets. The default is to generate checksums. |

Return value:

| | |
|---|---|
| 0 | Success |
| SOCKET_ERROR | The call to the Ethernet device driver software (in the Network process) encountered an error. |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | unsigned long htonl(unsigned long data)

Return value:

| | |
|---|---|
| Converted value for "data" | Success |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | unsigned short htons(unsigned short data)

Return value:

| | |
|---|---|
| Converted value for "data" | Success |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | int init(DWORD threadSpecifier)

A single call to init( ), which is a OS-specific function, is required by each thread that will be making socket calls. The parameter specifies a dynamic thread template. The thread-template refers to one of the dynamic threads that is defined for the network process.

Return value:

| | |
|---|---|
| INIT_STATUS_SUCCESS | Successful initialization. |
| INIT_STATUS_STRUCTURE_FULL | The Network process and the socket library use a data structure to map mailbox handles to threads. This structure can handle |

-continued

| | |
|---|---|
| | up to 64 threads. An attempt to start more than 64 threads in the Network process results in this return value. |
| INIT_STATUS_THREAD_NOT_CREATED | An attempt by the Network process to create a dynamic thread from the template specified by threadSpecifier failed. The template ID must be consistent with the platform registry entries for the Network process. |
| INIT_STATUS_NO_MAILBOX_ACCESS | An attempt to give the Network process access to the mailbox created by this process failed. This could happen if the Network process is not loaded, or if the name of the Network process has been changed without the socket library being rebuilt. In either case, the call to startup( ) would also fail. This return value also occurs if the Network process is unable to give this process access to its newly created mailbox. This would indicate a system error or a problem with the Network process or socket library. In this case, startup( ) would have succeeded. |
| INIT_STATUS_MAILBOX_NOT_CREATED | An attempt to create a mailbox failed. The attempt could have been made by the process calling init( ), or by the Network process. This could be caused by an insufficient quota of mailboxes specified in the platform registry for the Network process or the process calling init( ). |
| INIT_STATUS_MESSAGE_NOT_SENT | An error occurred in attempting to send a message to the Network process. |
| INIT_STATUS_MESSAGE_NOT_RECEIVED | An error occurred in attempting to receive a message from the Network process. |
| INIT_STATUS_ENVELOPE_CREATION_FAILED | A mailbox envelope could not be created by the socket library. | int ioctlsocket(int s, int request, unsigned long *argp)

return value:

| | |
|---|---|
| 0 | Success |
| SOCKET_ERROR | The call to the Ethernet device driver software (in the Network process) encountered an error. |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | int listen(int s, int backlog)

Return value:

| | |
|---|---|
| 0 | Success |
| SOCKET_ERROR | The call to the Ethernet device driver software (in the Network process) encountered an error. |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | unsigned long ntohs(unsigned long data)

Return value:

| | |
|---|---|
| Converted value for "data" | Success |
| SOCKET_ERROR_INIT_NOT_CALLED | The calling thread has not called init( ). It must be called before calls to other socket functions (except startup( )). |
| SOCKET_ERROR_MESSAGE_NOT_SENT | An error occurred in attempting to send a message to the Network process. |
| SOCKET_ERROR_MESSAGE_NOT_RECEIVED | An error occurred in attempting to receive a message from the Network process. | unsigned short ntohs(unsigned short data)

Return value:

| | |
|---|---|
| Converted value for "data" | Success |
| SOCKET_ERROR_INIT_ NOT_CALLED | The calling thread has not called init( ). It must be called before calls to other socket functions (except startup( )). |
| SOCKET_ERROR_MESSAGE_ NOT_SENT | An error occurred in attempting to send a message to the Network process. |
| SOCKET_ERROR_MESSAGE_ NOT_RECEIVED | An error occurred in attempting to receive a message from the Network process. | int recv(int s, char *buf, int len, int flags)

Return value:

| | |
|---|---|
| Number of bytes received SOCKET_ERROR | Success The call to the Ethernet device driver software (in the Network process) encountered an error. |
| SOCKET_ERROR_INIT_ NOT_CALLED | The calling thread has not called init( ). It must be called before calls to other socket functions (except startup( )). |
| SOCKET_ERROR_MESSAGE_ NOT_SENT | An error occurred in attempting to send a message to the Network process. |
| SOCKET_ERROR_MESSAGE_ NOT_RECEIVED | An error occurred in attempting to receive a message from the Network process. | int recvfrom(int s, char *buf, int len, int flags, sockaddr *from, int *fromlen)

Return value:

| | |
|---|---|
| Number of bytes received SOCKET_ERROR | Success The call to the Ethernet device driver software (in the Network process) encountered an error. |
| SOCKET_ERROR_INIT_ NOT_CALLED | The calling thread has not called init( ). It must be called before calls to other socket functions (except startup( )). |
| SOCKET_ERROR_MESSAGE_ NOT_SENT | An error occurred in attempting to send a message to the Network process. |
| SOCKET_ERROR_MESSAGE_ NOT_RECEIVED | An error occurred in attempting to receive a message from the Network process. | int select(int nfds, fd_set *readfds, fd_set *writefds, fd_set *exceptfds, timeval *timeout)

Return value:

| | |
|---|---|
| Number of ready sockets 0 SOCKET_ERROR | Success Timeout The call to the Ethernet device driver software (in the Network process) encountered an error. |
| SOCKET_ERROR_INIT_ NOT_CALLED | The calling thread has not called init( ). It must be called before calls to other socket functions (except startup( )). |
| SOCKET_ERROR_MESSAGE_ NOT_SENT | An error occurred in attempting to send a message to the Network process. |
| SOCKET_ERROR_MESSAGE_ NOT_RECEIVED | An error occurred in attempting to receive a message from the Network process. | int send(int s, char *buf, int len, int flags)

int sendto(int s, char *buf, int len, int flags, sockaddr *to, int tolen)

Return value:

| | |
|---|---|
| Number of bytes sent SOCKET_ERROR | Success The call to the Ethernet device driver software (in the Network process) encountered an error. |
| SOCKET_ERROR_INIT_ NOT_CALLED | The calling thread has not called init( ). It must be called before calls to other socket functions (except startup( )). |
| SOCKET_ERROR_MESSAGE_ NOT_SENT | An error occurred in attempting to send a message to the Network process. |
| SOCKET_ERROR_MESSAGE_ NOT_RECEIVED | An error occurred in attempting to receive a message from the Network process. | int setsockopt(int s, int level, int optname, char *optval, int optlen)

Return value:

| | |
|---|---|
| 0 SOCKET_ERROR | Success The call to the Ethernet device driver software (in the Network process) encountered an error. |
| SOCKET_ERROR_INIT_ NOT_CALLED | The calling thread has not called init( ). It must be called before calls to other socket functions (except startup( )). |

-continued

| | |
|---|---|
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | int shutdown(int s, int how)

Return value:

| | |
|---|---|
| 0 | Success |
| SOCKET_ERROR | The call to the Ethernet device driver software (in the Network process) encountered an error. |
| SOCKET_ERROR_INIT_<br>NOT_CALLED | The calling thread has not called init( ). It must be called before calls to other socket functions (except startup( )). |
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | int socket(int domain, int type, int protocol)

Return value:

| | |
|---|---|
| Socket descriptor | Success |
| SOCKET_ERROR | The call to the Ethernet device driver software (in the Network process) encountered an error. |
| SOCKET_ERROR_INIT_<br>NOT_CALLED | The calling thread has not called init( ). It must be called before calls to other socket functions (except startup( )). |
| SOCKET_ERROR_MESSAGE_<br>NOT_SENT | An error occurred in attempting to send a message to the Network process. |
| SOCKET_ERROR_MESSAGE_<br>NOT_RECEIVED | An error occurred in attempting to receive a message from the Network process. | int startup (mutex_handle_t mutex)

This is an OS-specific function to initialize communications with the network process 110. A single call to startup( ) is required by each network application process (NAP) before any other calls to the socket library. The socket library requires a mutex to support multi-threaded applications.

Return value:

| | |
|---|---|
| STARTUP_STATUS_SUCCESS | Successful startup. |
| STARTUP_STATUS_NO_<br>MAILBOX_HANDLE | The handle to the Network process' static mailbox could not be obtained. |
| STARTUP_STATUS_NO_<br>PROCESS_HANDLE. | The handle of the Network process could not be obtained. |

While the invention has been described in conjunction with preferred embodiments, it should be understood that modifications will become apparent to those of ordinary skill in the art and that such modifications are intended to be included within the scope of the invention and the following claims.

What is claimed is:

1. In an operating system environment, a method for accessing a network process comprising the steps of:
   placing a first call from a user thread, the first call identifying a thread template, the thread template specifying processor time allocated to a thread instantiated from the thread template;
   creating a first mailbox for the user thread, the first mailbox having a first handle;
   sending a first message to the network process, the first message including the first mailbox handle and identifying the thread template;
   creating a network thread in the network process from the thread template, the network thread having processor time allocated as specified by the thread template;
   creating a second mailbox for the network process, the second mailbox having a second handle;
   sending a second message to the first mailbox, the second message identifying the second mailbox handle; and
   associating the user thread, first mailbox handle and the second mailbox handle, such that API calls from the user thread to the network thread are delivered through the second mailbox and responses from the network thread to the user thread are delivered through the first mailbox.

2. The method of claim 1 wherein the step of placing a first call comprises placing the first call to a socket library.

3. The method of claim 2 wherein the step of creating a first mailbox for the user thread comprises the socket library creating the first mailbox.

4. The method of claim 3 wherein the step of sending the second message to the first mailbox comprises sending the second message through the socket library.

5. The method of claim 1 further comprising the steps of
   performing an API call from the user thread;
   determining the handle of the user thread making the API call;
   retrieving the first mailbox handle and second mailbox handle associated with the user thread making the API call;
   delivering the API call from the user thread to the network thread through the second mailbox; and
   receiving a response from the network thread through the first mailbox.

6. The method of claim 5 wherein the step of determining the handle of the user thread is performed by a socket library.

7. The method of claim 6 wherein the step of retrieving the first mailbox handle and second mailbox handle associated with the user thread is performed by the socket library.

8. The method of claim 5 wherein the step of receiving a response from the network thread comprises utilizing the block feature of mailboxes.

9. The method of claim 1 wherein the second mailbox is accessible only for API calls from the user thread.

10. The method of claim 1 further comprising the steps of:
placing a relinquish access call from the user thread;
deleting the first and second mailboxes; and
deleting the network thread.

11. The method of claim 1 further comprising the steps of:
creating a third mailbox for a second user thread, the third mailbox having a third handle;
creating a second network thread in the network process;
creating a fourth mailbox for the network process, the fourth mailbox having a fourth handle; and
associating the second user thread, third mailbox handle and the fourth mailbox handle, such that API calls from the second user thread to the network thread arc delivered through the fourth mailbox.

12. In an operating system environment, a system for permitting accesses to a network process by a user thread, the system comprising:
a plurality of thread templates;
a user thread mailbox;
a network thread mailbox; and
a socket library, the socket library receiving a call from the user thread identifying one of the plurality of thread template, each of the plurality of thread templates specifying processor time allocated to a thread instantiated from the thread template, the socket library passing the call to the network process such that the network process creates a network thread from the identified thread template, the network thread having processor time allocated as specified by the thread template, the socket library associating the user thread, the user thread mailbox and the network thread mailbox such that API calls from the user thread to the network thread arc delivered through the network thread mailbox and calls from the network thread to the user thread arc delivered through the user thread mailbox.

13. The system of claim 2 wherein the socket library determines the user thread mailbox and the network thread mailbox corresponding to the user thread from a plurality of mailboxes.

14. The system of claim 2 wherein the user thread mailbox and the network thread mailbox include blocking features.

15. The system of claim 2 wherein the network mailbox is accessible only for API calls from the user thread.

16. In an operating system environment, a system for permitting accesses to a network process by a plurality of user threads, the system comprising:
a plurality of thread templates, each of the plurality of thread templates specifying processor time allocated to a thread instantiated from the thread template;
a plurality of user thread mailboxes, each of the plurality of user thread mailboxes associated with one of the user threads;
a plurality of network threads, each of the plurality of network threads created from one of the plurality of thread templates identified by an associated user thread and having processor time allocated as specified by the one of the plurality of thread templates;
a plurality of network thread mailboxes, each of the plurality of network thread mailboxes associated with one of the plurality of network threads; and
a socket library, the socket library receiving API calls from the plurality of user threads and passing the API calls to the network thread associated with the calling user thread through the associated network thread mailbox and passing calls from the network thread to the user thread through the associated user thread mailbox.

* * * * *